Nov. 21, 1939.  W. H. N. STEVENS  2,180,561
COMBINED CANTEEN, COOKING, AND MESS KIT
Filed Nov. 21, 1938.
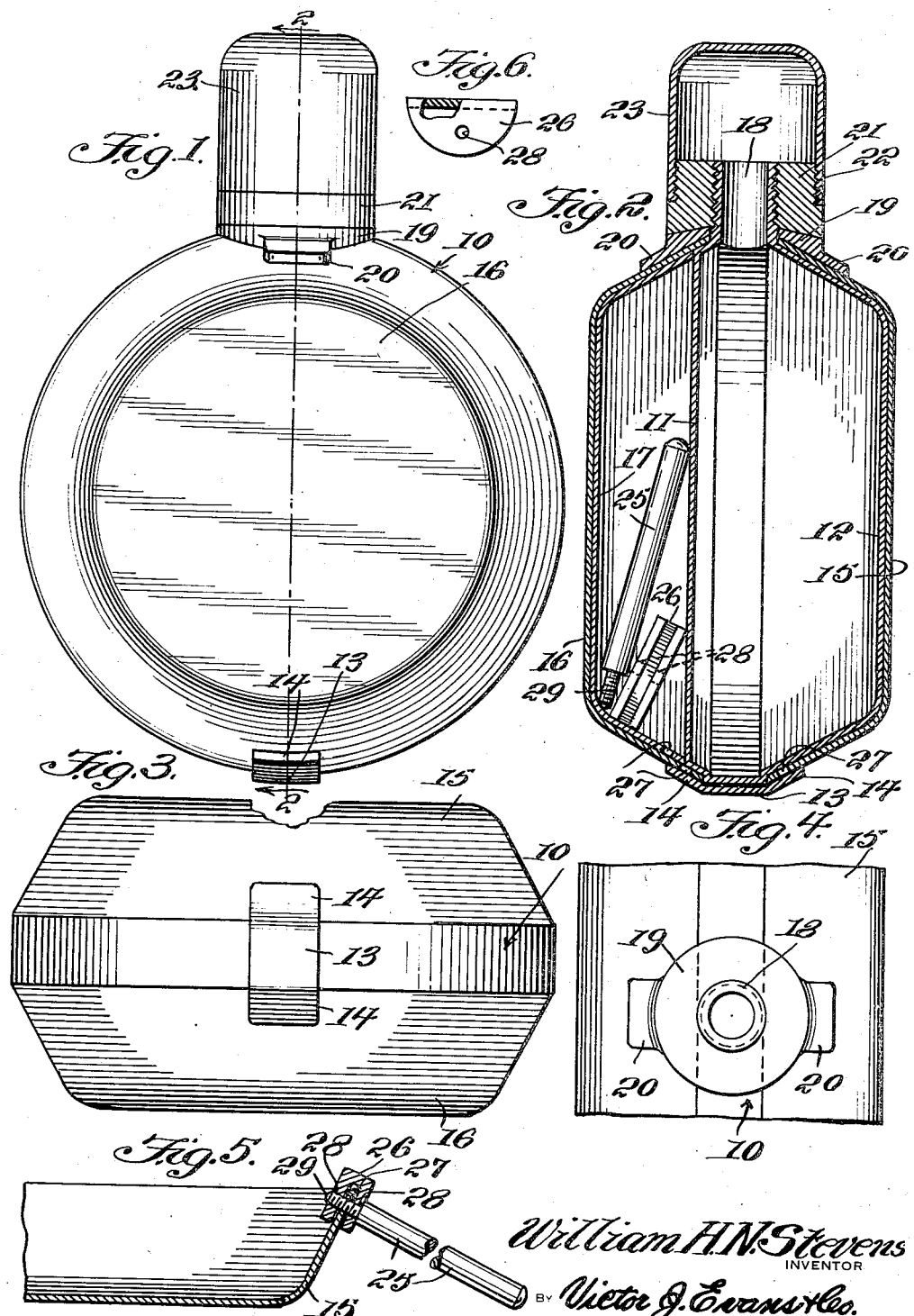

Patented Nov. 21, 1939

2,180,561

UNITED STATES PATENT OFFICE 2,180,561

COMBINED CANTEEN, COOKING, AND MESS KIT

William H. N. Stevens, Columbus, Ohio

Application November 21, 1938, Serial No. 241,680

4 Claims. (Cl. 206—4)

My invention relates to a combined canteen, cooking and mess kit and is an improvement over the construction disclosed in my patent Serial Number 2,101,414, dated December 7, 1937.

One of the principal objects of my invention is to provide a compact assembly of utensils which will be free from the usual objectionable projections, which may be readily assembled and disassembled, and which may be easily maintained in a sanitary condition.

A further object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a side elevation of my invention.

Figure 2 is a sectional view taken on the line 2—2 of Figure 1.

Figure 3 is a bottom plan view of the invention.

Figure 4 is a fragmentary top plan view thereof, certain of the parts being removed.

Figure 5 is a fragmentary sectional view of one of the utensils illustrating the detachable handle connected thereto.

Figure 6 is a front elevation, partly in section, of the member coacting with the detachable handle for securing the latter to the utensil.

In practicing my invention, I provide a canteen 10 fashioned with a shallow side 11 and a deep side 12 as clearly illustrated in Figure 2 of the drawing, both of said sides being of a frustum configuration in cross section.

The canteen 10 has fixed to the bottom thereof, between said sides, a clamping member 13 formed with laterally extending arms 14 spaced from the sides 11 and 12 for a purpose hereinafter set forth. A frying pan 15 is arranged on the deep side of said canteen, and a similar shaped cooking pan 16 is arranged over the other side. Nested within the cooking pan 16, is a mess kit 17 of a similar shape and having a circumferentially extending face of the side thereof abutting the shallow side 11 on the outer face of the latter at the marginal edge thereof.

The top of said canteen is fashioned with an upwardly extending threaded neck 18, the latter being disposed centrally of the device when the parts are in assembled condition as illustrated in Figure 2 of the drawing. Positioned on the neck 18 and axially movable relative thereto for detachment therefrom is a clamping member 19 having laterally extending arms 20 for coaction with the member 13. Threaded on the neck 18 is a lock nut 21, the latter being of a cylindrical configuration and fashioned on the upper section thereof with external threads 22 for connection with the lower interiorly threaded end of a cap 23, the latter constituting a drinking cup or the like.

The sides of the pans 15 and 16, adjacent the outer ends thereof, are disposed between the arms 14 and 20 and over the shallow and deep sides 11 and 12. Said pans are secured about said sides by the coaction of said arms 14 and 20, it being understood that the lock nut 21 is employed for locking the member 19 against the sides of the pans 15 and 16 whereby to maintain the opposite ends of the latter interposed between the arms 14 and sides 11 and 12, as clearly illustrated in Figure 2 of the drawing.

When it is desired to disassemble the device, the nut 21 is removed or loosened from the neck 18 to permit removal or partial removal of the member 19. In this position, the pans 15 and 16 may be readily removed from the canteen together with the plate 17. However, the drinking cup 23 may be removed from the nut 21 without disassembling the pans to permit liquid being poured from the canteen through the neck 18.

Carried within the mess kit plate 17, when assembled, is a detachable handle 25 and a coacting member 26 for securing said handle to a desired pan or plate. Each of the pans 15 and 16 and the plate 17 is formed with an aperture 27 in the side wall thereof, and the member 26, which is of a U-shaped configuration, is provided with registering threaded apertures 28 adapted for registry with an aperture 27 of a pan or plate.

When it is desired to equip one of the pans or the plate with the handle 25, the member 26 is positioned over the end of the pan or plate with the threaded apertures 28 registering with the aperture 27. In this position, a threaded end 29 of the handle is threaded through the apertures 28 and thereby secures said handle to the pan or plate as clearly illustrated in Figure 6 of the drawing.

From the foregoing it will be apparent that I have provided a simple combined canteen, cooking and mess kit which, when in assembled condition, forms a compact assembly of the utensils and is entirely free of the usual objectionable projections.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation which are capable of extended application in advance forms, and that the invention comprehends all construction within the scope of the appended claims.

What I claim is:

1. A device of the character described, comprising, a canteen having a neck, laterally extending arms on the bottom of said canteen, a frying pan arranged on one side of said canteen, a cooking pan arranged on the other side of said canteen, said pans having side walls interposing said canteen and said arms, a clamping member mounted on said neck and having arms engaging said side walls for coaction with said first mentioned arms to secure said pans to said canteen.

2. A device of the character described, comprising, a canteen having a neck, laterally extending arms on the bottom of said canteen, a frying pan arranged on one side of said canteen, a cooking pan arranged on the other side of said canteen, said pans having side walls interposing said canteen and said arms, a clamping member mounted on said neck and having arms overlying said pans for coaction with said first mentioned arms to secure said pans to said canteen, and means adjustably mounted on said neck for maintaining said member clamped against said pans.

3. A device of the character described, comprising, a canteen having oppositely disposed side sections, pans mounted on said side sections and provided with side walls, and a pair of oppositely disposed clamping members mounted on said canteen between said side sections and having laterally extending arms engaging said side walls and coacting with each other for securing said pans to said canteen in fixed relation therewith.

4. A device of the character described, comprising, a canteen having oppositely disposed side sections, pans mounted on said side sections and provided with side walls, and a pair of oppositely disposed clamping members mounted on said canteen between said side sections and having laterally extending arms engaging said side walls and coacting with each other for securing said pans to said canteen in fixed relation therewith, one of said clamping members adjustable in a direction away from said canteen to permit said pans to be removed from said canteen.

WILLIAM H. N. STEVENS.